E. L. BEEZLEY & F. LANE.
FERTILIZER DISTRIBUTER.
APPLICATION FILED OCT. 15, 1914.
1,135,492.
Patented Apr. 13, 1915.
2 SHEETS—SHEET 2.
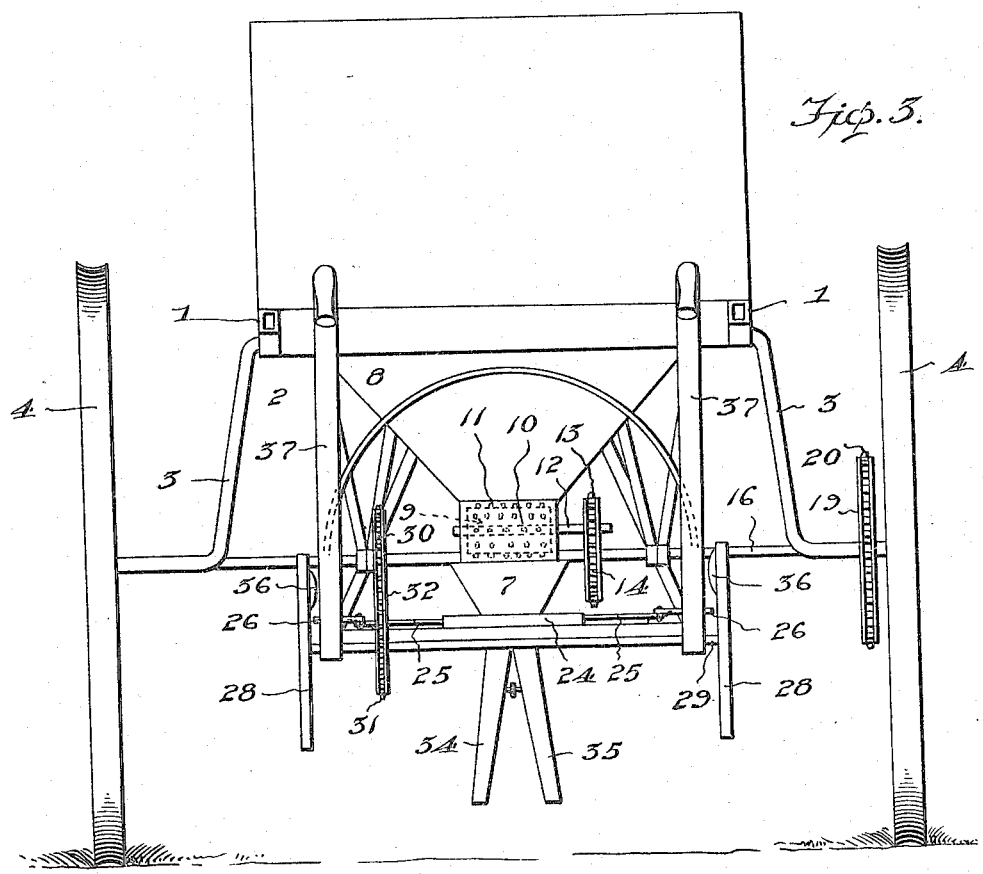
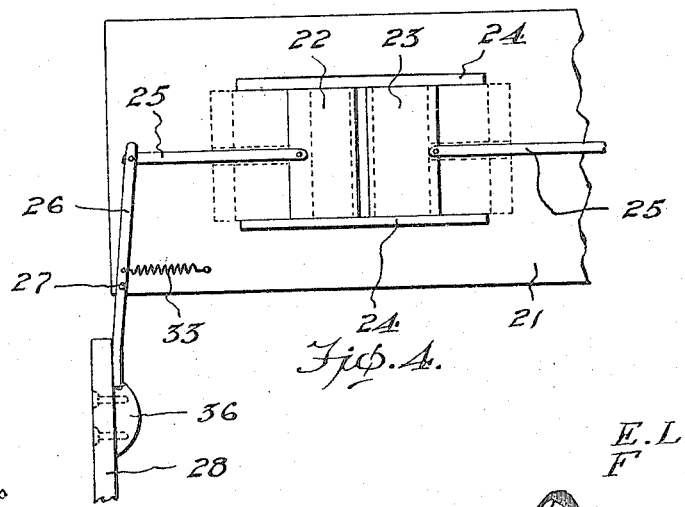
Inventor
E. L. Beezley
F. Lane

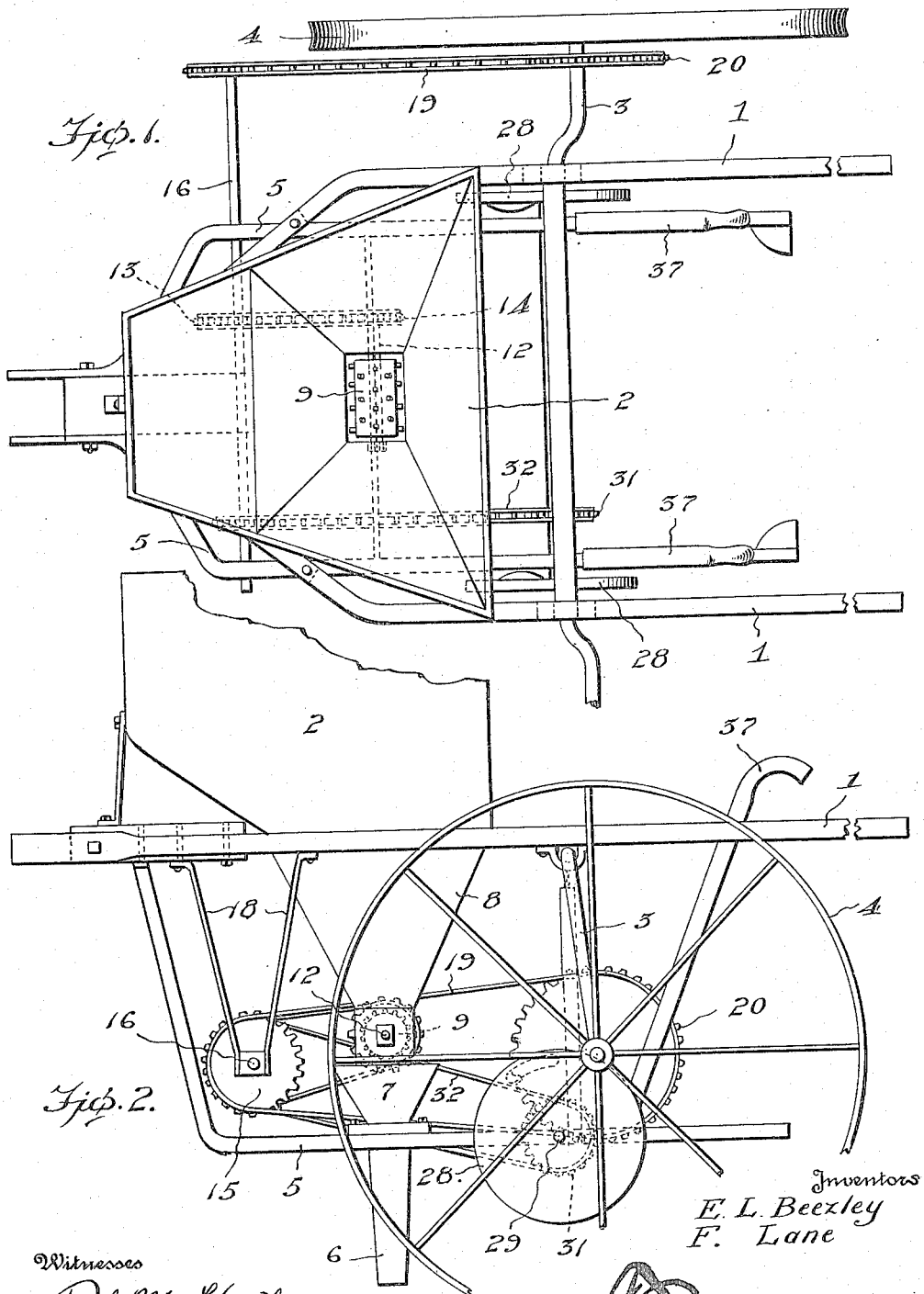

UNITED STATES PATENT OFFICE.

ERNEST L. BEEZLEY AND FRANK LANE, OF MOUNT PLEASANT, IOWA.

FERTILIZER-DISTRIBUTER.

1,135,492.  Specification of Letters Patent.  Patented Apr. 13, 1915.

Application filed October 15, 1914. Serial No. 866,836.

*To all whom it may concern:*

Be it known that we, ERNEST L. BEEZLEY and FRANK LANE, citizens of the United States, residing at Mount Pleasant, in the county of Henry and State of Iowa, have invented certain new and useful Improvements in Fertilizer-Distributers; and we do hereby declare the following to be a full, clear, and exact description of the invention, such as will enable others skilled in the art to which it appertains to make and use the same.

This invention relates to agricultural implements and more particularly to a device for distributing fertilizer over a field, upon the ground and around the base of growing plants.

Another object of this invention is the provision of a fertilizer as specified which embodies means for automatically depositing a predetermined quantity of fertilizer during the travel of the distributer over the field.

A still further object of this invention is the provision of a rotary roller which has a plurality of radially disposed fingers formed thereupon, which are positioned within the outlet of the fertilizer for agitating the same to permit of the free flowing thereof.

Another object of this invention is to provide a fertilizer distributing spout which is split for straddling a row of growing plants for properly distributing fertilizer upon each side and about the base of the growing plant.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a top plan view of the improved fertilizer. Fig. 2 is a side elevation of the improved fertilizer showing part thereof broken away. Fig. 3 is an end view of the improved fertilizer and Fig. 4 is a detail plan view of the mechanism for automatically depositing predetermined quantities of fertilizer.

Referring more particularly to the drawings, 1 designates the supporting frame of the fertilizer distributer which has a fertilizer retaining box 2 mounted thereupon, and a traction wheel carrying axle 3 secured to the under surface thereof and depending therefrom. The axle 3 is what is known as a U-axle or crank axle, having its ends disposed downwardly and in crank relation to the body portion thereof. The axle 3 has ordinary traction wheels 4 mounted thereupon, to provide for the carrying of the fertilizer over a field.

The frame 1 has suspended there beneath an auxiliary frame 5. The frame 5 has a fertilizer distributing spout 6 secured thereto, which has a funnel top or mouth 7, positioned beneath the funnel shaped outlet 8 of the fertilizer retaining box 2. The funnel outlet 8 of the fertilizer retaining box 2 has an agitator 9 positioned in its lower end, which agitator comprises a roller 10 which has a plurality of circumferentially spaced fingers 11 formed thereupon. The roller 10 is rotatably mounted upon a shaft 12, which shaft is supported by the sides of the outlet 8. The shaft 12 has a sprocket 13 mounted thereupon, about which a sprocket chain 14 passes. The sprocket chain 14 also passes about a sprocket 15 which is mounted upon a shaft 16. The shaft 16 is suspended beneath the frame 1 and rotatably supported by depending bracket arms 18. The shaft 16 is rotated by a sprocket connection with the axle 3 through the medium of a sprocket chain 19, and a sprocket 20 which is mounted upon the axle adjacent one of the traction wheels 4.

The auxiliary frame 5 has a platform 21 extending thereacross, through which platform is inserted the divided spout 6. The divided spout 6 which is provided for the outlet of the fertilizer has slots formed in the sides thereof immediately above the plate or platform 21, in which are seated bearings 22 and 23 for cutting off the feeding of fertilizer therethrough. The doors 22 and 23 are slidably mounted in guideways 24, which are carried by the upper surface of the platform 21 and they have arms 25 connected thereto. The arms 25 extend across the platform 21 from the doors toward the opposite ends of the platform and they have levers 26 connected to their outer ends. The levers 26 are pivoted upon pins 27 which are carried by the platform 21 and their forward free end, which is free from connection with the arm 25 lies in abutting engagement with cams 28. The cams 28 are carried upon a shaft 29, which shaft is supported by the auxiliary frame 5 and has sprockets and chain connection with the shaft 16 through the medium of sprockets 30 and 31 and a sprocket chain 32. The levers 26 have contracting spiral springs 33 secured thereto, which springs are secured to the platform 21 and are provided for normally holding the levers positioned so that the doors 22 and 23 will form a closure for the opening between the funnel 7 and the divided spout 34 and 35 of the fertilizer outlet spout 6. The cams 28 have enlargements 36 formed upon their inner faces and adjacent their marginal edges, which enlargement, upon the rotation of the cams, engage the ends of the levers 26 which lie in abutting engagement with the inner surfaces of the cams 28 and move these levers upon their pivotal point for sliding the doors 22 and 23 outwardly from each other for permitting of the passage of fertilizer through the spouts 34 and 35.

The frame 5 has handles 37 secured thereto, to provide for the manual guiding of the same.

In the operation of the improved fertilizer distributer, the fertilizer is placed within the fertilizer retaining box 2 and it passes therefrom through the funnel shaped outlet 8. The agitator 9 which is positioned in the mouth of the outlet 8 will break up large particles of the fertilizer and permit the same to flow freely out of the retaining box 2 into the dispensing spout 6. The fertilizer will pass downwardly into the funnel shaped mouth 7 of the dispensing spout 6, and upon the actuation of the levers 26, by the enlargements 36 in the manner heretofore described, the doors 22 and 23 will be moved outwardly from each other to permit of the fertilizer to fall downwardly through the spouts 34 and 35 upon the ground which is being fertilized.

This fertilizing device may be used for the fertilization of growing grain, in that the divided spouts will deposit the fertilizer upon both sides of a row of grain for the efficient fertilization of the same during growing.

From the foregoing description taken in connection with the accompanying drawings the advantages of the construction and of the method of operation of the improved fertilizer distributer will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

In a fertilizer distributer, a supporting frame, a fertilizer retaining box, a detached dispensing spout, a platform suspended beneath said supporting frame, a pair of slidable doors carried by said platform, arms connected to said doors, levers connected to said arms, disks carried by said platform, means for rotating said disks by the traction of said frame, enlargements formed upon one face of said disks, said levers engaging said disks and operable by said enlargements for moving said doors from each other for permitting of the passage of fertilizer through said dispensing spouts, and means for moving said doors toward each other for cutting off the passage of fertilizer through said dispensing spouts.

In testimony whereof we affix our signatures in presence of two witnesses.

ERNEST L. BEEZLEY.
FRANK LANE.

Witnesses:
H. T. WAUGH,
C. W. PARRIOTT.

Copies of this patent may be obtained for five cents each, by addressing the "Commissioner of Patents, Washington, D. C."